United States Patent
Gadkaree et al.

(10) Patent No.: US 6,699,412 B2
(45) Date of Patent: Mar. 2, 2004

(54) COMPRESSION-MOLDED SILICON CARBIDE STRUCTURES

(75) Inventors: Kishor P. Gadkaree, Big Flats, NY (US); Joseph F. Mach, Lindley, NY (US)

(73) Assignee: Corning Incorporated, Corning, NY (US)

( * ) Notice: Subject to any disclaimer, the term of this patent is extended or adjusted under 35 U.S.C. 154(b) by 78 days.

(21) Appl. No.: 09/991,401

(22) Filed: Nov. 20, 2001

(65) Prior Publication Data

US 2003/0094716 A1 May 22, 2003

(51) Int. Cl.⁷ .............................................. C01B 31/00
(52) U.S. Cl. ...................... 264/29.7; 423/345
(58) Field of Search ........................ 264/29.7; 423/345

(56) References Cited

U.S. PATENT DOCUMENTS

| | | | | |
|---|---|---|---|---|
| 3,947,550 A | * | 3/1976 | Fitchmun | 423/345 |
| 4,693,988 A | * | 9/1987 | Boecker et al. | 501/89 |
| 5,460,759 A | * | 10/1995 | Dubots | 264/29.7 |
| 6,401,799 B1 | * | 6/2002 | Arai et al. | 164/463 |
| 6,555,031 B2 | * | 4/2003 | Gadkaree et al. | 264/29.7 |

* cited by examiner

Primary Examiner—Christopher A. Fiorilla
(74) Attorney, Agent, or Firm—Anca C. Gheorghiu; Adenike Adewuya

(57) ABSTRACT

A process for forming a silicon carbide structure includes molding by compression a mixture of a silicon precursor powder and a cross-linking thermoset resin to form a rigid structure, carbonizing the rigid structure, and forming a silicon carbide structure by heating the carbonized rigid structure at a temperature sufficient to allow carbon and silicon in the structure to react to form silicon carbide.

15 Claims, 2 Drawing Sheets

COMPRESSION-MOLDED SILICON CARBIDE STRUCTURES

BACKGROUND OF INVENTION

1. Field of the Invention

The invention relates to a process for forming a silicon carbide structure.

2. Background Art

Silicon carbide is useful in many applications because of its excellent high temperature strength, chemical durability, high oxidation resistance, high abrasion resistance, and high thermal conductivity. In the automotive industry, for example, silicon carbide structures are used to filter particulate material from exhaust gases of diesel engines. Typically, the geometry of the silicon carbide filter is honeycomb. The honeycomb geometry provides a very high surface area per unit volume, allowing a large amount of particulate material to be packed into the filter body.

Current methods for producing silicon carbide structures generally include sintering a green body of particulate material at very high temperatures, typically in excess of 2000° C., for many hours. This makes silicon carbide structures very expensive to produce. Therefore, a method of producing silicon carbide structures at lower temperatures would be beneficial.

SUMMARY OF INVENTION

In one aspect, the invention relates to a process for forming a silicon carbide structure which comprises molding by compression a mixture of a silicon precursor powder and a cross-linking thermoset resin to form a rigid structure, carbonizing the rigid structure, and forming a silicon carbide structure by heating the carbonized rigid structure at a temperature sufficient to allow carbon and silicon in the structure to react to form silicon carbide.

In another aspect, the invention relates to a process for forming a silicon carbide structure which comprises compression-molding a mixture of a silicon precursor powder, a cross-linking thermoset resin, and a silicon carbide powder to form a rigid structure, carbonizing the rigid structure, and forming a silicon carbide structure by heating the carbonized rigid structure at a temperature sufficient to allow carbon and silicon in the structure to react to form silicon carbide.

In another aspect, the invention relates to a process for forming a silicon carbide structure which comprises compression-molding a mixture of a silicon precursor powder and a cross-linking thermoset resin to form a rigid structure, carbonizing the rigid structure in an inert atmosphere at a temperature in a range from about 700 to 1000° C. to convert the cross-linking thermoset resin to carbon, and heating the rigid structure in an inert atmosphere to a temperature in a range from about 1400 to 1800° C. to allow the carbon to react with silicon in the rigid structure to form silicon carbide.

Other features and advantages of the invention will be apparent from the following description and the appended claims.

DETAILED DESCRIPTION

Embodiments of the invention provide a process for forming silicon carbide structures at temperatures much lower than 2000° C. In general, the method involves preparing a mixture of a silicon precursor powder and a cross-linking thermoset resin, compression-molding the mixture to form a rigid preform, and carbonizing the rigid perform to form the silicon carbide structure. Specific embodiments of the invention are described below.

Figure 1:
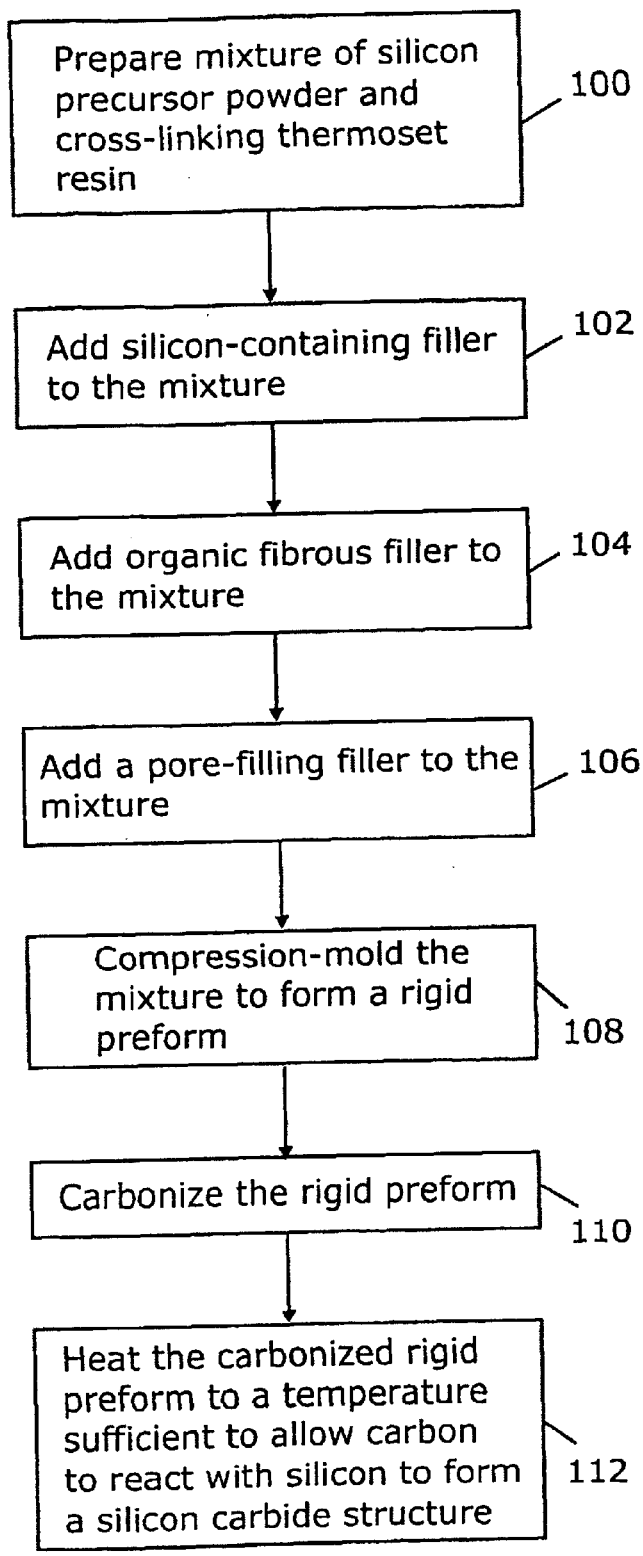
FIG. 1 is a flowchart illustrating a process for forming a silicon carbide structure according to an embodiment of the invention.

A process for forming a silicon carbide structure, as shown in FIG. 1, starts with mixing of a silicon precursor powder with a cross-linking thermoset resin (ST100) and then compression-molding the mixture to form a rigid preform (ST108). The silicon precursor and can be any source of silicon, such as silicon metal powder, silane, silica, or silica precursor. The mean particle size of the silicon precursor powder may be in a range from 1 to 100 μm, and preferably in a range from 10 to 40 μm, depending on the feature size desired in the final product.

The cross-linking thermoset resin preferably has a high carbon yield. In general, the carbon yield should be at least 20% by weight. Examples of common cross-linking thermoset resins having high carbon yield include phenol-formaldehyde resin, urea-formaldehyde resin, and melamine formaldehyde resin or resins based on furfuryl alcohol, such as Furan resins. The preferred thermoset resin is a phenolic resin with a carbon yield of about 50% by weight. Rigid structures formed by compression-molding of cross-linking thermoset resins with high carbon yields maintain their shapes during and after carbonization.

The amount of silicon precursor in the mixture may be in a range from 10 to 60% by weight. The amount of the thermoset resin in the mixture may be in a range from 10 to 60% by weight. Preferably, the thermoset resin is soluble in water, or is in liquid form, so that it intimately mixes with the silicon precursor to ultimately form a homogeneous silicon carbide structure. Preferably, the amount of silicon precursor and cross-linking thermoset resin in the mixture is such that the mixture exhibits carbon to silicon atomic ratio of about 1:1. This would ensure that no further reaction between silicon and carbon occurs at high temperatures, e.g., 1400 to 2000° C., after the rigid preform has been converted to a silicon carbide structure and that no residual silicon remains in the structure.

Before compression-molding the mixture of thermoset resin and silicon precursor power, an amount of silicon-containing filler may be added to the mixture (ST102). The filler amount may vary from 10 to 75% by weight in the mixture. The weight percent of the filler in the mixture will determine the shrinkage of the structure during the process. The lower the filler percentage, the higher the shrinkage. The silicon-containing filler may be silicon carbide, silicon nitride, or silicate materials that can withstand temperatures of at least 1400° C. Preferably, the silicon-containing filler is in powder form. The mean particle size of the filler powder may vary from 1 to 100 μm, and preferably from 5 to 50 μm.

For honeycomb structures, an organic fibrous filler may also be added to the mixture (ST104). Inclusion of organic fibrous filler in the mixture contributes to the formation of good honeycomb structure. Examples of fibrous fillers include cotton fiber, cellulose fiber, wood fiber or crushed nut shells, or other organic similar-type fibrous material. A pore-filling filler, such as polyethylene beads or other thermoplastic or graphite fillers, may also be added to the mixture (ST106). The pore-forming filler facilitates the formation of pores of desired size in the structure. The fibrous and pore-filling fillers may each be added in an amount of 1 to 15% by weight and, preferably, in an amount of 5 to 10% by weight.

The mixture of silicon precursor, thermoset resin, and fillers is compression-molded at the cure temperature of the resin (ST108). The compression molding process involves placing the mixture in the cavity of a mold that has a desired shape. The mold is then closed and held at a high pressure. The mold is heated to a temperature to initiate curing of the thermoset resin. The cure temperature is low, i.e., in the 80 to 150° C. range. The mixture hardens into the shape of the mold as the resin cures. The hardened mixture has a very high green density because the rigid resin holds the particles together. The pressure during molding also compacts the mixture, allowing intimate contact between the silicon and resin.

The rigid preform is carbonized to convert the cured resin to carbon (ST110). Typically, the carbonization temperature is in a range from 700 to 1000° C. The carbonization can be carried out in an inert atmosphere, such as argon, nitrogen, or vacuum. The carbonized preform is heated to allow the carbon and silicon in the preform to react to form silicon carbide (ST112). Typically, the carbonized preform is heated to a temperature in a range from 1400 to 1800° C. The heating can be carried out in an inert atmosphere, such as argon or vacuum.

To further illustrate the principles of the invention, a specific example of a silicon carbide structure formed according to the invention is described below. However, it is to be understood that the example is given for illustrative purposes only and is not intended to limit the invention.

EXAMPLE

Figure 2:
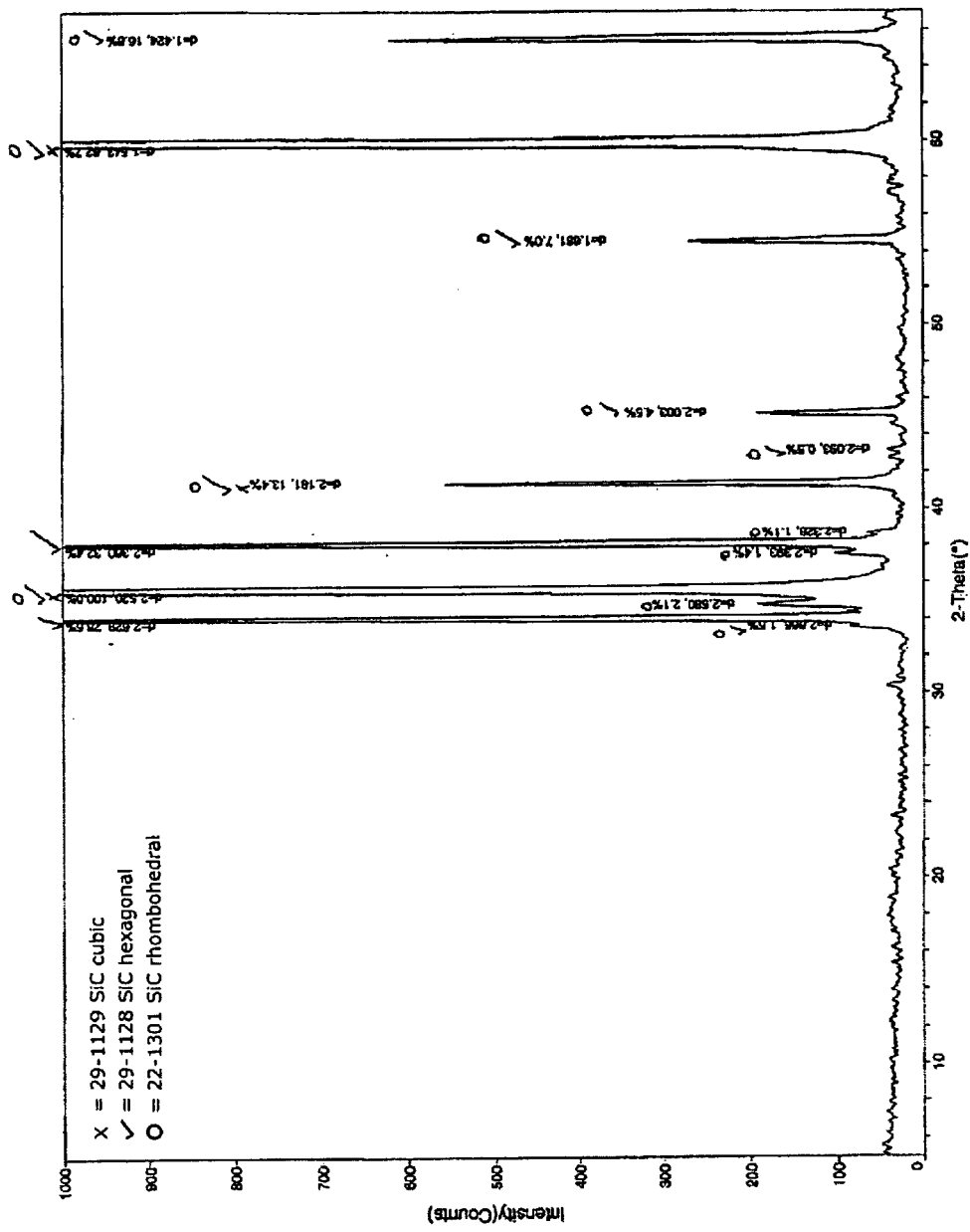
FIG. 2 is a plot of an X-ray analysis of a silicon carbide structure formed by the process of the invention.

The following raw materials were mixed together: 47.28% by weight silicon carbide powder, 25.45% by weight percent silicon powder (−325 mesh), and 27.26% by weight liquid phenolic resin. The mixture was compression molded at 150° C. in a steel mold. A strong and dense compact preform was obtained. The preform was heated in nitrogen to 900° C. (carbonization) and then heated in vacuum at 1500° C. for one hour. The process yielded a strong and hard silicon carbide molded structure. FIG. 2 shows an X-ray plot of the silicon carbide structure. The X-ray plot shows a complete conversion to silicon carbide with no residual phases present in the structure.

The invention provides one or more advantages. A mixture of a silicon precursor powder and a cross-linking thermoset resin is molded by compression to form a rigid preform. The pressure during molding compacts the mixture and allows a very high green density to be maintained when the resin is cured. The rigid preform is easy to handle and does not crumble when subjected to further processing. One of the advantages of using a cross-linking thermoset resin is that he rigid preform can be formed at a low process temperature, e.g., 80 to 150° C. Subsequent carbonization and heating steps are used to convert the rigid preform to a silicon carbide structure. These processes occur at temperatures much lower than 2000° C. The heating process is relatively short, typically lasting 1 hour.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A process for forming a silicon carbide structure, comprising:

forming a mixture of a silicon precursor powder, a cross-linking thermoset resin and a silicon-containing filler selected from powder of the group consisting of silicon carbide, silicon nitride and silicate materials;

compression molding the mixture to form a rigid structure;

carbonizing the rigid structure in an inert atmosphere at a temperature in a range from about 700 to 1000° C. to convert the cross-linking thermoset resin to carbon; and heating the rigid structure in an inert atmosphere to a temperature in a range from about 1400 to 1800° C. to allow the carbon to react with silicon in the rigid structure to form silicon carbide.

2. The process of claim 1, wherein a mean particle size of the silicon precursor powder ranges from about 1 to 100 $\mu$m.

3. The process of claim 1, wherein a mean particle size of the silicon precursor powder ranges from about 5 to 50 $\mu$m.

4. The process of claim 1, wherein the mixture comprises about 10 to 60% by weight of the silicon precursor powder.

5. The process of claim 1, wherein the mixture comprises about 10 to 60% by weight of the cross-linking thermoset resin.

6. The process of claim 1, wherein the mixture exhibits a carbon to silicon atomic ratio of about 1:1.

7. The process of claim 1, wherein the cross-linking thermoset resin has a carbon yield of at least 20% by weight.

8. The process of claim 7, wherein the cross-linking thermoset resin is a phenolic resin.

9. The process of claim 1, wherein the silicon-containing filler is silicon carbide.

10. The process of claim 1, wherein the mixture comprises 10 to 75% by weight of the silicon-containing filler.

11. The process of claim 1, wherein a mean particle size of the silicon-containing filler is in a range from 1 to 100 $\mu$m.

12. The process of claim 1, further comprising adding a pore-forming filler to the mixture prior to molding the mixture.

13. The process of claim 12, wherein the pore-forming filler is added in an amount ranging from about 1 to 15% by weight.

14. The process of claim 1, further comprising adding an organic fibrous filler to the mixture prior to molding the mixture.

15. The process of claim 14, wherein the organic fibrous filler is added in an amount ranging from about, 1 to 15%.

* * * * *